United States Patent
Richardson et al.

(10) Patent No.: US 10,371,265 B2
(45) Date of Patent: Aug. 6, 2019

(54) PROCESS CONTROL VALVE AND PLUG

(71) Applicant: Fisher Controls International LLC, Marshalltown, IA (US)

(72) Inventors: Jonathan Wesley Richardson, Marshalltown, IA (US); Timothy Randall Parrie, Mingo, IA (US); Robert Lee Backes, Marshalltown, IA (US); David Steven Goode, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 15/801,143

(22) Filed: Nov. 1, 2017

(65) Prior Publication Data
US 2019/0128428 A1  May 2, 2019

(51) Int. Cl.
*F16K 1/32* (2006.01)
*F16K 25/00* (2006.01)
*F16K 51/00* (2006.01)

(52) U.S. Cl.
CPC ............ *F16K 1/32* (2013.01); *F16K 25/00* (2013.01); *F16K 51/00* (2013.01)

(58) Field of Classification Search
CPC ... F16K 3/12; F16K 25/00; F16K 1/32; F16K 1/54; F16K 51/00
USPC ............ 251/120–122, 324; 239/456, 583
See application file for complete search history.

(56) References Cited

U.S. PATENT DOCUMENTS

| | | | | |
|---|---|---|---|---|
| 1,921,761 | A * | 8/1933 | Leins | F16K 5/0207 137/613 |
| 1,994,389 | A * | 3/1935 | Frisco | B05B 1/308 239/451 |
| 2,963,042 | A * | 12/1960 | Dolby | F16K 5/103 251/263 |
| 3,317,184 | A * | 5/1967 | Usry | F16K 1/38 251/122 |
| 4,383,553 | A * | 5/1983 | Platt | F16K 25/04 251/122 |
| 5,228,604 | A * | 7/1993 | Zanini | B67C 3/281 239/456 |
| 6,186,470 | B1 * | 2/2001 | Officier | B65B 39/004 251/122 |

(Continued)

OTHER PUBLICATIONS

Fisher SS-83 Angle Valve Instruction Manual; 12 pages; retrieved from the internet <http://www.customcontrols.co.nz/ServicesAndSupport/Library/Files/Control Valves and Accessories/Manuals/Sliding Stem Valves/Fisher SS-83 Angle valve IOM.pdf>; Copyright Fisher Controls International LLC 1995, 2010, All Rights Reserved; at least as early as Jan. 1, 2018.

(Continued)

*Primary Examiner* — John Bastianelli
(74) *Attorney, Agent, or Firm* — Quarles & Brady LLP

(57) ABSTRACT

A process control valve comprises a valve body having an inlet and an outlet and a plug. The plug selectively restricts fluid communication between the inlet and the outlet. The plug can have a plug body and a plurality of fins extending radially outward from the plug body between a first end of the plug and a second end of the plug. Each one of the plurality of fins can have a tapered section proximate the second end of the plug. The tapered section can taper radially inward toward the second end of the plug.

20 Claims, 6 Drawing Sheets

(56) References Cited

U.S. PATENT DOCUMENTS

| | | | |
|---|---|---|---|
| 6,409,055 B1* | 6/2002 | Officier | B65B 39/004 |
| | | | 222/559 |
| 7,798,433 B2* | 9/2010 | Onishi | F02M 61/1853 |
| | | | 239/533.2 |
| 8,028,968 B2* | 10/2011 | Gum | F23D 14/04 |
| | | | 137/601.19 |
| 8,312,902 B2* | 11/2012 | Mengibar Rivas | B67C 3/281 |
| | | | 141/192 |
| 2006/0043327 A1* | 3/2006 | Hunter | F16K 3/02 |
| | | | 251/326 |
| 2015/0020903 A1* | 1/2015 | Mastrovito | F16K 1/54 |
| | | | 137/625.37 |
| 2015/0238981 A1* | 8/2015 | Yuan | B05B 7/06 |
| | | | 239/584 |

OTHER PUBLICATIONS

Fisher 461 Increased Outlet Angle Sweep-Flo Valve Product Bulletin; dated Aug. 2013; 12 pages; retrieved from the internet <http://www.emerson.com/documents/automation/fisher-461-increased-outlet-angle-sweep-flo-valve-en-3587744.pdf; Copyright 1994, 2013 Fisher Controls International LLC, All Rights Reserved; at least as early as Jan. 1, 2018.

Flowserve Valtek Survivor Control Valves Installation, Operation, Maintenance Instructions; 6 pages; retrieved from the internet <https://www.pro-quip.com/images/proquip/PDFs/Library/IOMs/Valtek Valves/Valtek Survivor Control Valves.pdf>; at least as early as Jan. 1, 2018.

\* cited by examiner

PROCESS CONTROL VALVE AND PLUG

BACKGROUND

Process control valves are widely used in chemical processing plants. As shown in FIG. 1, a conventional process control valve 10 operates to selectively permit fluid flow between an inlet 12 and an outlet 14 along a flow path. A plug 16 opens or closes the valve 10 by translating axially within a guiding sleeve 20 between a closed position and an open position. In the closed position, a head 18 of the plug 16 blocks a narrowing aperture 22 and engages a valve seat 26 to block the flow path, preventing flow through the valve 10. In the open position, the head 18 of the plug 16 is positioned away from the narrowing aperture 22 and the valve seat 26. In the open position, flow passes through a cylindrical channel 24 defining the narrowing aperture 22 and through the outlet 14. A user pushes or pulls a valve stem 28 to move the valve plug 16 axially within the sleeve 20.

Process control valves 10 are sometimes used to selectively permit the flow of slurries including dense process materials. The dense process materials within the slurry tend to build up and cause clogging along various places in the flow path and around the plug 16. In the ethanol production process, for example, sugarcane bagasse is processed and transported through a processing facility. A number of process control valves are positioned in the flow path of the bagasse to selectively permit bagasse movement. The fibrous nature of bagasse causes build-ups of material to occur within the valve 10 along the guiding surfaces of the plug 16 or sleeve 20 and in a gap 30 above the plug 16. The build-ups of material decrease the clearance between the plug 16 and the sleeve 20 and increase the friction experienced by the plug 16 when an operator attempts to close or open the process control valve 10. At times, the material buildup becomes so substantial that the plug 16 becomes completely stuck in one position or cannot open fully, and the valve 10 cannot operate properly. A lengthy operational shutdown and maintenance procedure to clean the plug 16 and sleeve 20 must then be performed.

SUMMARY

Some embodiments of the invention are directed toward an improved process control valve having a plug that is capable of moving or slicing through process material build-up. The process control valve can effectively translate axially between open and closed positions when process material build-up is present within the guiding sleeve of the process control valve.

Some embodiments of the invention are directed toward a process control valve. The process control valve comprises a valve body having an inlet and an outlet, as well as a plug. The plug selectively restricts fluid communication between the inlet and the outlet. The plug comprises a plug body and a plurality of fins extending radially outward from the plug body between a first end of the plug and a second end of the plug. Each one of the plurality of fins has a tapered section proximate the second end of the plug. The tapered section tapers radially inward toward the second end of the plug.

Some embodiments of the invention are directed toward a plug adapted for use in a push-down-to-close valve. The plug comprises a plug body having a longitudinal axis, a first end, and a second end spaced apart from the first end along the longitudinal axis. The first end comprises a plugging section tapering outward from the first end toward the second end. The second end has a plurality of fins extending radially outward from the plug body. Each one of the plurality of fins is formed about the longitudinal axis and extends from the second end toward the first end. Each one of the plurality of fins comprises a tapered section and a guiding surface. The tapered section extends radially outward from the second end toward the guiding surface.

Figure 1:
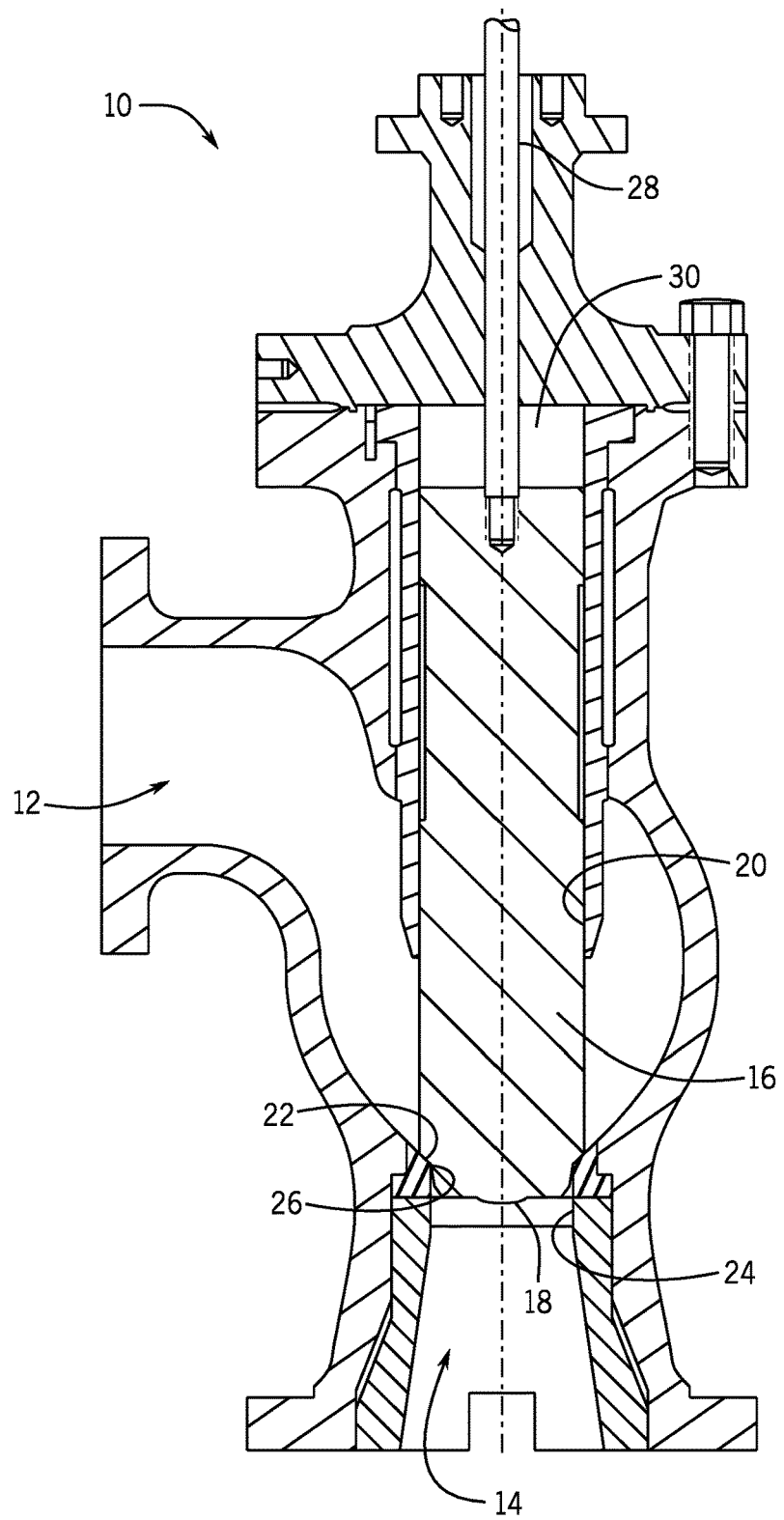
FIG. 1 is a cross-sectional view of a prior art process control valve using a standard plug.

Corresponding reference characters indicate corresponding parts throughout the several views. Although the drawings represent embodiments of the present invention, the drawings are not necessarily to scale and certain features may be exaggerated in order to better illustrate and explain the embodiments of the present invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention provide a process control valve configured to selectively restrict fluid flow between a first fluid carrier and a second fluid carrier. In particular, embodiments of the invention provide a plug adapted for use in a process control valve that is capable of moving or slicing through process material buildup within the process control valve during use.

Figure 2A:
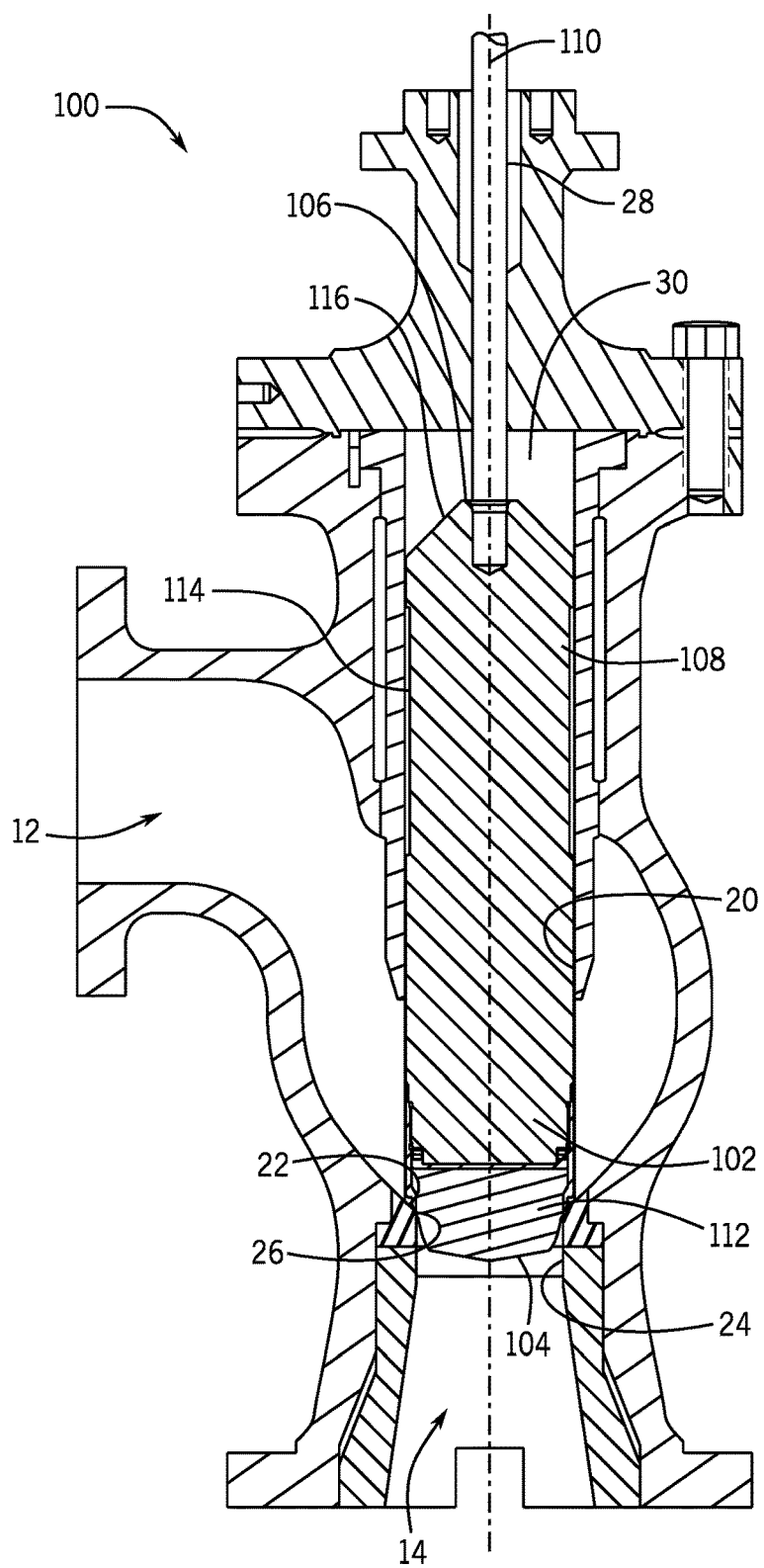
FIG. 2A is a cross-sectional view of a process control valve incorporating a plug according to one embodiment of the invention.
Figure 2B:
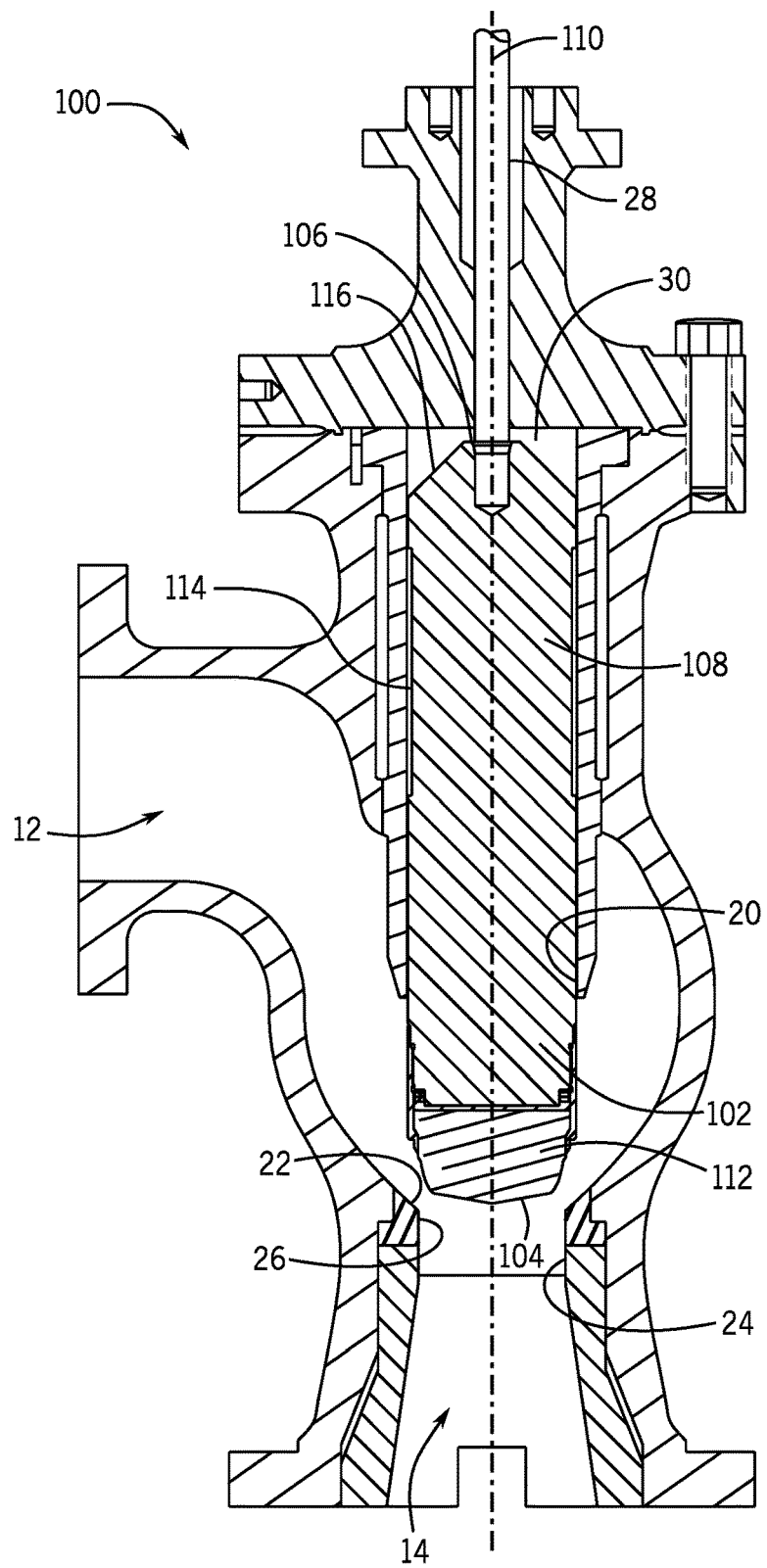
FIG. 2B is a cross-sectional view of the process control valve of FIG. 2A in a second position.

FIGS. 2A and 2B illustrate a process control valve 100 according to one embodiment of the invention. The process control valve 100 includes an inlet 12 and an outlet 14 to receive and output fluids including, for example, slurries, water-based solutions, acidic solutions, and steam. A cylindrical channel 24 defines an aperture 22 within the primary fluid flow path positioned between the inlet 12 and outlet 14. When the aperture 22 is unobstructed, fluid may pass through the inlet 12 to the outlet 14, and out of the process control valve 100. A pump (not shown) may be configured to drive fluid from a fluid source (not shown) through the inlet 12, through the aperture 22, and finally through the outlet 14 of the process control valve 100.

The process control valve 100 includes a plug 102 that selectively restricts fluid flow between the inlet 12 and the outlet 14. The plug 102 can be positioned within the sleeve 20, which can guide the plug 102 as it moves axially between a closed position (shown in FIG. 2A) and an open position (shown in FIG. 2B). The sleeve 20 can help prevent improper radial movement of the plug 102 that results in improper sealing of the aperture 22 or valve failure. In some embodiments, the plug 102 is coupled to a valve stem 28 that moves the plug 102 axially between open and closed positions. The valve stem 28 extends outwardly from the process control valve 100 so that it is readily accessible to a user without needing to access the interior components of the process control valve 100. As shown in FIG. 2B, when the valve stem 28 is pulled upwardly, the plug 102 moves upwardly, opening the process control valve 100 to restore fluid communication between the inlet 12 and the outlet 14 through the aperture 22. Conversely, when the stem 28 is pushed down, the plug 102 moves downwardly within the sleeve 20 until it engages a valve seat 26 that extends outwardly from the aperture 22. As shown in FIG. 2A, the plug 102 can seal the aperture 22 and restrict fluid flow between the inlet 12 and the outlet 14.

Referring to FIGS. 2A-5, the plug 102 includes a first or plugging end 104, a second or shearing end 106, and a body 108 extending between the first end 104 and the second end 106 along a longitudinal axis 110. The plug 102 also includes a plugging section 112 at the plugging end 104. The plugging section 112 of the plug 102 includes an outer surface that engages the valve seat 26 to seal at least a portion of the aperture 22. The plugging section 112 can include an inward taper having a cross-section that reduces in size as it moves away from the body 108 toward the first end 104 of the plug 102. In some embodiments, the plugging section 112 can be sized to engage the valve seat 26 and partially extend through the aperture 22 into the outlet 14 when the process control valve 100 is closed.

In some embodiments, the plug 102 can include one or more fins 114 positioned around the circumference of the plug 102. The fins 114 can extend outwardly from the body 108. In some embodiments, the fins 114 extend parallel to the longitudinal axis 110 of the plug 102. In some embodiments, the fins 114 extend outwardly from the longitudinal axis of the plug 102 and are linear. Alternatively, the fins 114 can have a helical or winding shape and can wrap around a portion of the plug 102. In some embodiments, the fins 114 can begin in an area spaced from the plugging end 104 and extend to the second end 106 of the plug 102. In other embodiments, the fins 114 can extend any desired length along the plug 102 and each of the fins 114 need not extend the same distance along the plug 102.

The fins 114 can be used to guide the plug 102 within the sleeve 20 of the process control valve 100. In some embodiments, the fins 114 form a tight clearance fit (i.e. between about 0.005 cm and about 0.25 cm) between the plug 102 and the sleeve 20 of the process control valve 100. When an axial force is transferred to the plug 102 (e.g., through pushing or pulling the valve stem 28), the plug 102 will remain aligned over the aperture 22 and in position to either close or open the process control valve 100.

In some embodiments, the fins 114 can be spaced about the plug 102 to reduce the amount of potential surface contact between the plug 102 and the sleeve 20. Since buildups are most likely to occur along the surface of the sleeve 20, reducing the amount of surface contact between the plug 102 and sleeve 20 reduces the risk of the plug 102 sticking to material buildup along the sleeve 20. The size and shape of the one or more fins 114 may be chosen so that contact between the plug 102 and the sleeve 20 occurs only along a surface (e.g., a guiding surface 118, shown in FIGS. 3 and 4) of the fins 114. The fins 114 can also each produce a single line of contact between the plug 102 and the sleeve 20.

As shown in FIGS. 2A-4, the fins 114 can include a tapered section 116 at the second end 106 of the plug 102. The tapered section 116 can be positioned opposite the plugging section 112, and can be received entirely within the sleeve 20 of the process control valve 100. In some embodiments, the tapered section 116 shears process material buildup that may be present within the gap 30 above the plug 102. The tapered section 116 can be provided with a conical shape that reduces the amount of process material compacted or trapped within the gap 30 by the plug 102 when the plug 102 is moved upwardly from a closed position toward an open position. The tapered section 116 can include a number of sharpened, chamfered edges 150 that coincide with the number of fins 114.

Figure 3:
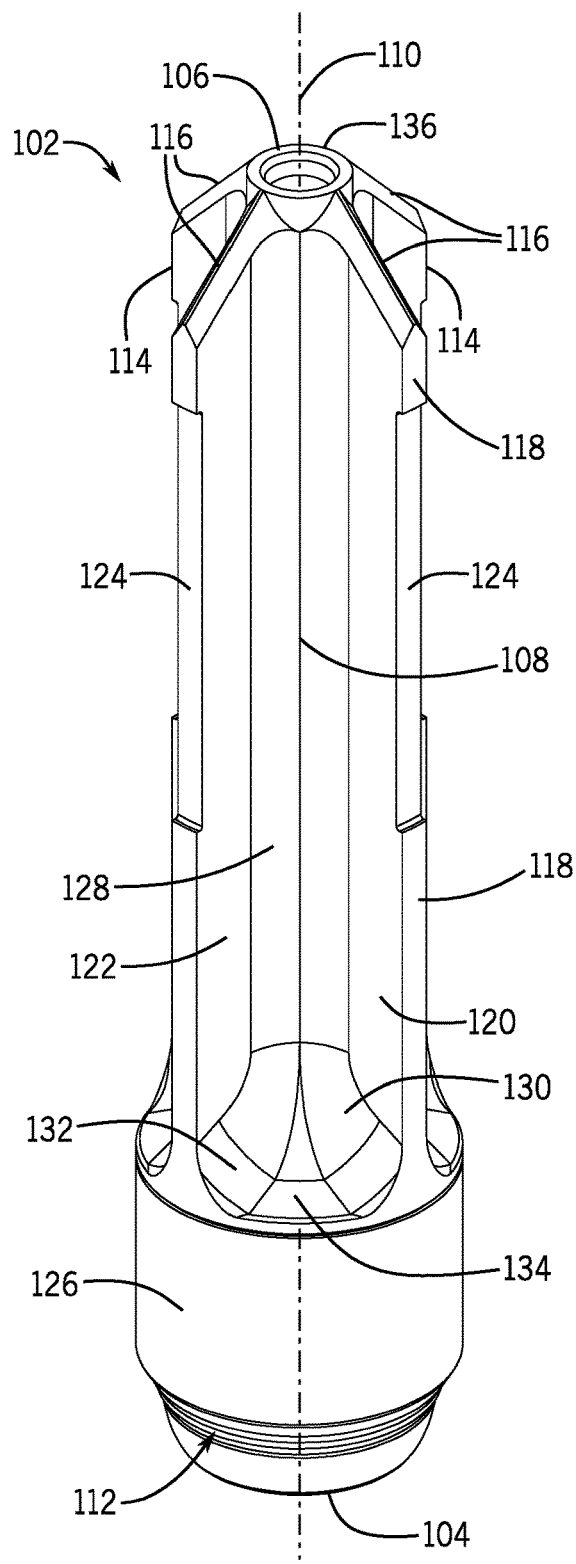
FIG. 3 is a top perspective view of the plug in the process control valve of FIG. 2A.
Figure 4:
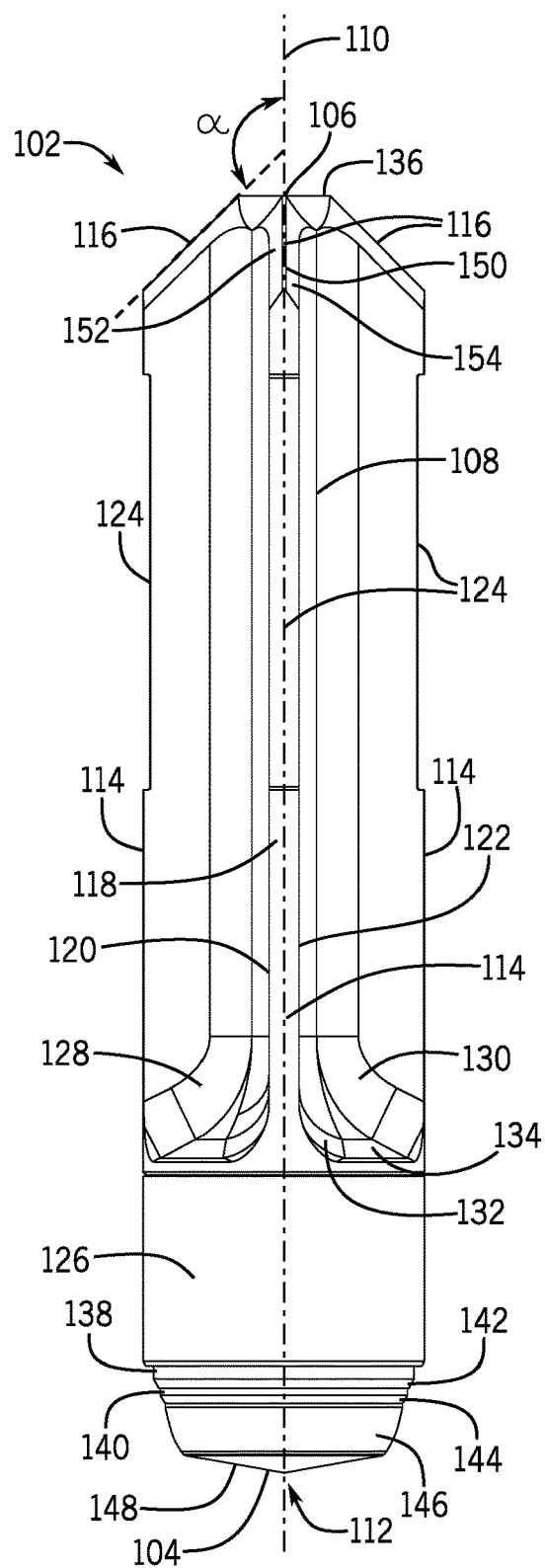
FIG. 4 is a front elevational view of the plug of FIG. 3.

FIGS. 3-4 illustrate one embodiment of a plug 102 having a particular geometry. In some embodiments, the plug 102 includes between two and six fins 114 spaced apart from one another around the circumference of the plug 102. The fins 114 can include a first wall 120 extending outwardly away from the plug body 108, a second wall 122 extending outwardly away from the plug body 108, and a guiding surface 118 spanning between the first wall 120 and the second wall 122. The guiding surface 118 can be a narrow, flat surface with edges formed by the first wall 120 and second wall 122 and can be sized to contact the inner surface of the sleeve 20 at two separate locations. The guiding surface 118 can form two lines of contact between the fin 114 and the sleeve 20, which further limits the amount of surface contact between the sleeve 20 and the plug 102. The guiding surface 118 extending between the first wall 120 and second wall 122 can form a chord (i.e., a line segment joining two points on a curve) with the cylindrical surface of the sleeve 20. Alternatively, the guiding surfaces 118 of the fins 114 can be rounded to form a convex shape. In some embodiments, the guiding surfaces 118 of the fins 114 can be defined by a radius approximately equal in length to a radius that defines the sleeve 20. Accordingly, the fins 114 can be positioned within the sleeve 20 so that the sleeve 20 can be contacted by a portion of the entire guiding surface 118. In some embodiments, the guiding surface 118 is positioned concentrically within the sleeve 20 when the plug 102 is properly installed. In still other embodiments, the guiding surface 118 can be concave. In these embodiments, the edges of the guiding surface 118 formed by the first wall 120 and the second wall 122 may again create two lines of contact between the fin 114 and the sleeve 20 when assembled. In some embodiments, the guiding surface 118 locates the plug 102 within the sleeve 20 and guides the plug 102 within the sleeve 20 as it translates between the open and closed positions.

To further reduce the potential contact area between the fins 114 and the sleeve 20, one or more notches 124 can be formed within the fins 114. The notches 124 can be cut out of the fins 114 and can extend inwardly from the guiding surfaces 118 of the fins 114. With the notches 124 removed from the guiding surfaces 118, the fins 114 form even less surface contact with the sleeve 20. In some embodiments, the notches 124 have a length that extends between about 30% and about 80% of the length of the fins 114. Some embodiments of the plug 102 can exclude the notches 124 and/or not all of the fins 114 need to include notches 124. The guiding surface 118 of each fin 114 can be continuous and uninterrupted between the plugging section 112 and the tapered section 116.

In some embodiments, the plug 102 includes a cylindrical section 126 that can at least partially constitute an outer surface of the plug 102. The cylindrical section 126 can have an outer surface defined by a radius larger than that of the aperture 22, so that the cylindrical section 126 extends outwardly beyond the aperture 22 when the plug 102 is positioned within the process control valve 100. When the plug 102 is pushed downward to close the process control valve 100, the cylindrical section 126 can act as a stop that prevents the plugging section 112 from being pushed downward into the outlet 14.

The cylindrical section 126 can have a circumference that forms a tight clearance fit within the sleeve 20. The cylindrical section 126 may extend radially outward to join the guiding surfaces 118 of the fins 114 to form a single continuous outer surface for the plug 102. In some embodiments, the cylindrical section 126 can extend upwardly away from the plugging section 112 toward the fins 114. The guiding surface 118 of the fins 114 can have a radius approximately equal to the radius defining the cylindrical section 126, so that the guiding surfaces 118 of the fins 114 and the outer surface of the cylindrical section 126 form a nearly continuous outer surface defined by a constant radius. In these embodiments, a portion of the cylindrical section 126 can be received within the sleeve 20 when the process control valve 100 is in an open position. The limited clearance between the cylindrical section 126 and the sleeve 20 can restrict the flow of process material through the sleeve 20 and upward into the gap 30, so that process material buildup can be reduced. The guiding surfaces 118 of the fins 114 can also be substantially flat. The guiding surfaces 118 can each be coplanar with planes tangent to the outer surface of the cylindrical section 126. In other embodiments, the outer surfaces 118 of the fins 114 can lie in separate planes parallel to planes tangent to the outer surface of the cylindrical section 126.

Figure 5:
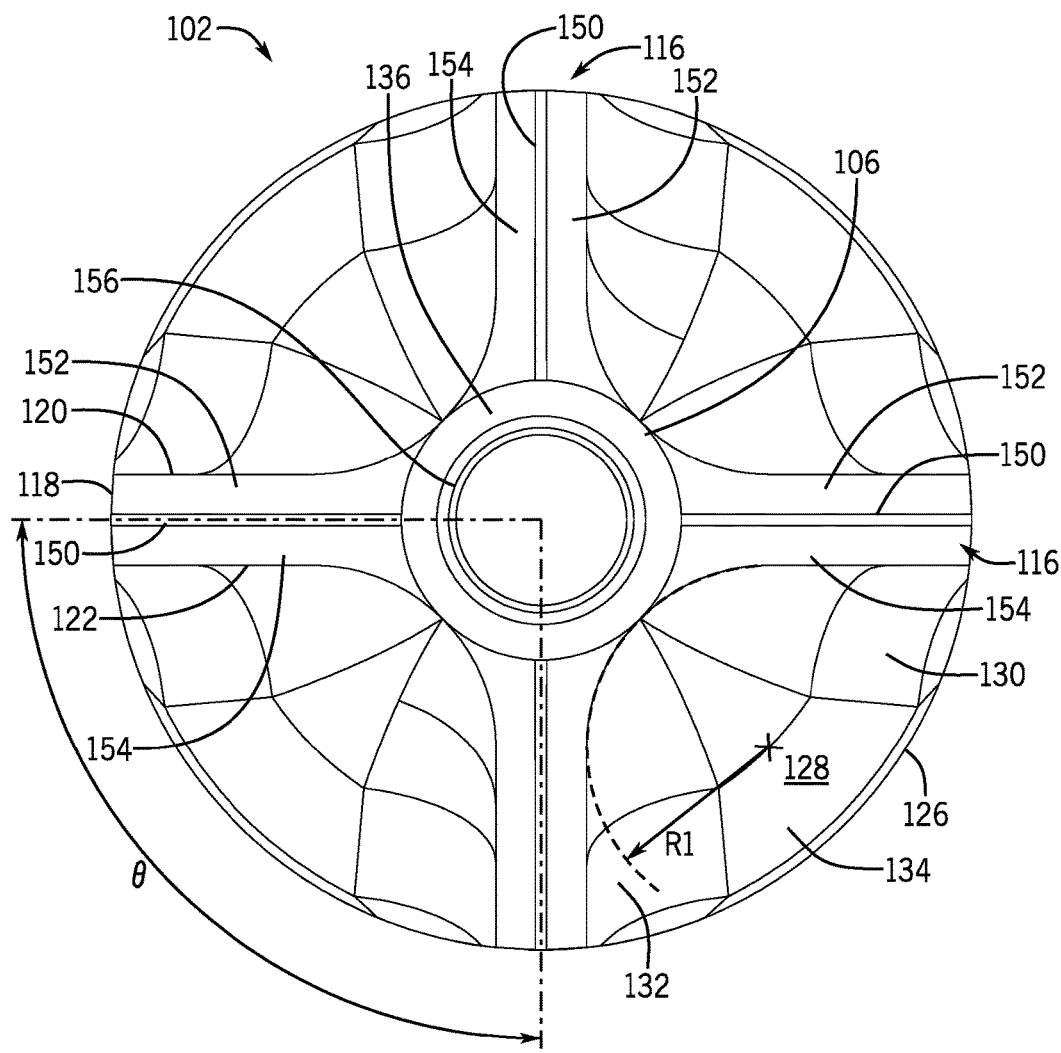
FIG. 5 is a top elevational view of the plug of FIG. 3.

As shown in FIG. 3, the one or more fins 114 can be positioned around the circumference of the plug 102 so that reliefs 128 are formed between each fin 114. In some embodiments, the relief 128 between adjacent fins 114 is formed of a combination of fin walls and rounded edges to form a single smoothly-curving surface. For example, the relief 128 can be partially defined by a first fin wall 120 that extends inwardly away from the guiding surface 118 of the fin 114. As shown in FIG. 5, the first fin wall 120 can extend radially inward toward a first fillet 130 (i.e., a rounded edge), which can be defined by a radius R1. The first fillet 130 can provide a rounded surface extending both radially inward toward the body 108 of the plug 102 and outwardly from the first fin wall 120. In some embodiments, the first fillet 130 also extends toward a second fillet 132 that extends radially outward and away from the first fillet 130. In some embodiments, the second fillet 132 is defined by a radius approximately equal in size to the radius that defines the first fillet 130. Similar to the first fillet 130, the second fillet 132 can extend outwardly toward a second fin wall 122. The second fin wall 122 can then extend outwardly toward another guiding surface 118 an adjacent fin 114. In some embodiments, the spacing between the fins 114 creates a sloped surface 134 positioned between the first fillet 130 and the second fillet 132 and proximate to the cylindrical section 126 of the plug 102. In some embodiments, the sloped surface 134 can be defined by a radius that allows the sloped surface 134, the first fillet 130, and the second fillet 132 to form a continuous concave surface. The combination of the sloped surface 134, the first fillet 130, and the second fillet 132 can extend outwardly and downwardly to form a portion of the perimeter of the relief 128 proximate the plugging section 112. In some embodiments, the combination of the sloped surface 134, the first fillet 130, and the second fillet 132 forms an edge with the outer surface of the cylindrical section 126.

The reliefs 128 between the fins 114 of the plug 102 are useful for both cleaning and plug operation. For example, the reliefs 128 reduce the amount of potential surface contact that occurs between the plug 102 and the sleeve 20. Accordingly, any buildup of material or process material within the sleeve 20 that is present between the fins 114 avoids contact with the plug 102, making the plug 102 less likely to stick or otherwise experience increased friction due to process material buildup. Additionally, the reliefs 128 enable a more complete flushing process of the sleeve 20. In some applications, a system that includes the process control valve 100 will require cleaning. A secondary fluid such as water, steam, solvent, or other suitable cleaning fluid (e.g., acidic solutions designed to dissolve built-up process material, bleach, ammonia, etc.) can be used to "flush" the valve 100 of material that may have built up. The primary process material buildup locations tend to occur on the wall of the sleeve 20 and in the gap 30 between the plug 102 and the sleeve 20. Secondary fluid can be passed into these areas to try to remove or at least reduce the process material buildups that have occurred, which is more efficient than completely disassembling the valve to manually clean the components. The reliefs 128 between the fins 114 enlarge the passageway for the secondary fluid to both enter up into the sleeve 20 and into the gap 30, as well as exit the gap 30 and sleeve 20 toward the outlet 14. Accordingly, a greater amount of secondary fluid can enter the inlet 12 and the sleeve 20. The reliefs 128 between the fins 114 form flow paths for the dislodged process material to then flow outwardly away from the gap 30 and the sleeve 20. The secondary fluid and dislodged process material exit the process control valve 100 through the aperture 22 and the outlet 14, producing a flushing effect.

As shown in FIGS. 3 and 4, the fins 114 can extend upwardly toward the tapered section 116, to one or more sharpened edges 150. Each fin 114 can include its own tapered section 116, and the tapered sections 116 can collectively extend toward the second end 106 of the plug 102. The tapered sections 116 can shear through fibrous or viscous process material that may be built up within the sleeve 20 or the gap 30. The tapered sections 116 can also displace built up process material to prevent or reduce the likelihood of the plug 102 seizing within the sleeve 20. The tapered sections 116 of each fin 114 can allow the plug 102 to continue making full strokes between the open and closed positions, helping to avoid system failure for an extended period of time.

The tapered section 116 of each fin 114 can extend upwardly and inwardly toward the second end 106 of the plug 102. As shown in FIG. 4, in some embodiments, each tapered section 116 angles upwardly and inwardly to form an angle α with the longitudinal axis 110 of the plug 102 between about 95 degrees and about 175 degrees. In one embodiment, the tapered section 116 angles upwardly and inwardly toward a top surface 136 of the plug 102 to form an angle α of between about 110 degrees and about 160 degrees with the longitudinal axis 110 of the plug 102. In some embodiments, the tapered section 116 of each fin 114 is chamfered to create a substantially linear surface forming a near constant angle α with the longitudinal axis 110 of the plug 102. In other embodiments, the tapered section 116 of a fin 114 can be concave, convex, or incrementally changing in shape.

In some embodiments, the top surface 136 of the plug 102 can be an annular surface coupled to the valve stem 28. The top surface 136 can have a radius smaller than the radius defining the outer surface of the cylindrical section 126. In some embodiments, the top surface 136 is substantially flat and engages the top of the sleeve 20 when the valve 100 is in a fully open position. In other embodiments, the top surface 136 shears any process material that may be built up within the sleeve 20 or gap 30 above the top surface 136. In other embodiments, the top surface 136 can be omitted entirely, and the tapered sections 116 of each fin 114 can meet together at a single apex that forms a leading point of the plug 102.

The plugging section 112 can engage the valve seat 26 to close the aperture 22 of the process control valve 100 in order to restrict fluid flow between the inlet 12 and outlet 14. In some embodiments, the plugging section 112 has a generally tapered shape that extends below the cylindrical section 126 of the plug 102. The generally tapered shape can include a number of different sections having outer surfaces that gradually reduce in size or radius. For example, as seen in FIG. 4, one or more steps 138, 140 can extend downwardly from the cylindrical section 126. In some embodiments, the steps 138, 140 can have a substantially cylindrical shape and can be defined by a radius smaller than the radius defining the outer surface of the cylindrical section 126. In some embodiments, the steps 138, 140 can be stacked with one another, and the radius of each sequential step can get smaller as the steps approach a bottom surface 148 of the plug 102. In some embodiments, each of the steps 138, 140 can be separated by another step 142, 144 having a chamfered outer surface that provides a generally inward taper between the steps 138, 140. The cylindrical section 126 of the plug 102 can be considered part of the plugging section 112 as well, as in some embodiments, the cylindrical section can also engage the valve seat 26 of the process control valve 100. Additionally, the cylindrical section 126 can perform a plugging function with the sleeve 20 when the plug 102 is in a fully open position.

As shown in FIG. 4, the steps 138, 140 can extend toward a gradually inward sloping section 146. In some embodiments, the gradually inward sloping section 146 is configured to engage the aperture 22 of the process control valve 100 when the plug 102 is in a closed position. The gradually inward sloping section 146 can have a radius larger than the radius defining the aperture 22 nearest the steps 138, 140 that gradually reduces in size as it extends toward the bottom surface 148 of the plug 102. Proximate the bottom surface 148 of the plug 102, the gradually inward sloping section 146 can have a radius smaller than the radius defining the aperture 22. By having an outer surface that gradually transitions in size between these two radii, a portion of the gradually inward sloping section 146 can extend partially into the aperture 22 until the surface of the gradually inward sloping section 146 forms an interference fit with the valve seat 26. The interference fit formed between the inward sloping section 146 and the aperture 22 prevents further movement of the plug 102 and produces a seal between the plug 102 and the valve seat 26.

The gradually inward sloping section 146 extends toward the bottom surface 148 of the plug, which can have a conical shape. In some embodiments, the conical shape of the bottom surface 148 can reduce drag as the plug 102 is pushed downward toward a closed position. However, the bottom surface 148 can alternatively be a flat surface, a convex surface, or a concave surface.

FIG. 5 further illustrates the orientation of the fins 114 about the plug 102. In some embodiments, the fins 114 can be spaced evenly around the circumference of the plug 102 and can each have a similarly-sized relief 128 positioned between them. In some embodiments, each of the reliefs 128 form a substantially parabolic shape positioned tangentially with respect to the outer perimeter of the top surface 136. As shown in FIG. 5, the fins 114 can be positioned about the longitudinal axis 110 of the plug 102 at an angle θ with respect to each adjacent fin 114. In embodiments having four fins 114, angle θ may be about 90 degrees and the spacing between each fin 114 is about equal. The plug 102 can include two or more fins 114, and the angle θ can be chosen with a different value to produce even spacing between the fins 114. For example, in embodiments of the plug 102 that include three fins 114, each fin 114 can be angularly offset from each adjacent fin 114 by an angle θ of about 120 degrees. In other embodiments, the angular offset between fins 114 is not always uniform about the plug 102. For example, two fins 114 can be spaced apart from one another by an angle of about 60 degrees, while the other two fins 114 can be spaced apart from one another by an angle of about 120 degrees.

Each of the fins 114 can include a tapered section 116 that displaces process material within the sleeve 20 as the plug 102 translates between a closed position and an open position. In some embodiments, as shown in FIG. 5, the tapered section 116 of each fin 114 can include an edge 150 that also shears process material buildup within the sleeve 20. A first blade surface 152 can extend upwardly and inwardly away from the first wall 120 of the fin 114. Similarly, a second blade surface 154 can extend upwardly and inwardly away from the second wall 122 of the fin 114. The first blade surface 152 and second blade surface 154 can extend toward one another to form the edge 150 at the apex of the two blade surfaces 152, 154. The first blade surface 152 and the second blade surface 154 can form an angle of between about 5 degrees and about 175 degrees at the edge 150. In one particular embodiment, the first blade surface 152 and second blade surface 154 form an angle of between about 15 degrees and about 135 degrees. In some embodiments, the blade surfaces 152, 154 can be cast into the plug 102 or otherwise formed on the plug 102 through an additive manufacturing process. In other embodiments, the blade surfaces 152, 154 can be ground to an angle (e.g., between about 15 degrees and about 135 degrees) that sharpens the edge 150, which can improve the shearing force of the tapered section 116 of the fins 114. In some embodiments, the edge 150 can be sharpened to an angle so that the plug 102 may actually cut or slice process material like a knife as the plug 102 translates between a closed position and an open position. Accordingly, the combination of the first blade surface 152, second blade surface 154, and edge 150 may together form a shearing surface on the plug 102.

The edges 150 of the tapered sections 116 can extend upwardly toward the top surface 136 of the plug 102 where they may terminate. In some embodiments, the top surface 136 is substantially annular in shape and engages a portion of the valve stem 28. As shown in FIG. 5, a coupling feature 156 can be formed in the plug 102 and can extend inwardly from the top surface 136 of the plug 102. For example, the coupling feature 156 can include a threaded hole machined into the top surface 136 of the plug 102 that threadably engages the valve stem 28. In other embodiments, the coupling feature 156 can be a through hole that is sized to form an interference fit with the valve stem 28, with or without an adhesive.

In some embodiments, the plug 102 is adapted for use in corrosive environments, such as chemical processing plants. To provide the necessary hardness and corrosion resistance at high temperatures, nickel-based alloys can be used. For example, some embodiments of the plug 102 are constructed of Inconel alloys, such as Inconel 718. In other embodiments, ceramics can be used to form a portion of the plug 102. In some applications, the plug 102 can be constructed entirely of ceramic, while in other applications, a metallic insert can be coated in ceramic that is then machined to the desired plug geometry. In some embodiments, only the fins 114 (including the tapered sections 116) are comprised of ceramic. In other embodiments, stainless steel or aluminum can be used to produce the plug 102. Various polymeric materials can also be used. In some embodiments, the plug 102 may comprise a core made of a first material and an outer surface coating of a second material.

In some embodiments, the plug 102 may be a cast piece that is machined to achieve the desired shape. In other embodiments, the plug 102 can be injection molded and then deburred to provide the final surface finishing. In still other embodiments, the plugging section 112 of the plug 102 can be formed on a lathe, while the fins 114 and tapered edges 116 can be formed using a mill. Additive manufacturing techniques such as 3-D printing can also be used to produce the plug 102. In still other embodiments, the fins 114 and tapered sections 116 can be welded to a stock piece of metal, which can then be machined to the desired shape. Additionally, a conventional prior art plug, such as the plug 16 shown in FIG. 1, can be milled to include the fin 114 and relief 128 geometry. Accordingly, existing plugs can be retrofitted to include some or all of the geometry of the plug 102 to produce a better functioning plug 16 without needing to replace the entire valve 10.

Various surfaces of the plug 102 may wear over time and require maintenance. For example, the edge 150 may need to be sharpened periodically. In other situations, the fin walls 120, 122 or fin outer surfaces 118 may need refinishing. A grinder, sander, file, or other machining technique can be used to provide the proper shape and finish to the plug 102.

Additionally, the plug 102 may not be formed of one single component, but can be an assembly of several individual components. For example, the fins 114 can be welded onto the plug 102. In other embodiments, the fins 114 can be removably coupled to the plug 102, so that they are replaceable. In other embodiments, the fin edges can be replaceable. In yet another embodiment, the fins can be a single assembly that can be removably coupled to the plug 102. Accordingly, the fin assembly can be removed and replaced with another fin assembly that would allow a user to change the number of fins present on the plug 102, depending on the application.

By incorporating some or all of the plug geometry disclosed and described above, thin-edge, multi-line contact can be achieved between the plug 102 and sleeve 20, reducing the risk of plug stickage due to buildup. The reliefs 128 between each guide fin 114 improve the flushing capacity of the process control valve 100 relative to more traditional process control valves 10, which reduces the need for lengthy valve maintenance processes. The shape of the tapered sections 116 of each fin 114 reduce the amount of process material that will be compacted within the gap 30. The edges 150 provided on each tapered section 116 are able to shear through process material that may have built up during the course of valve operation. Accordingly, the plug 102 is able to better avoid failure modes associated with stickage that may occur within the sleeve 20 of the process control valve 100.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A process control valve comprising:
a valve body having an inlet and an outlet, with a process flow path defined between the inlet and the outlet;
a guide sleeve extending into the process flow path between the inlet and the outlet, the guide sleeve defining a closed gap opposite the process flow path; and
a plug that is configured to move within the guide sleeve to selectively restrict process flow out of the outlet, the plug comprising a plug body and a plurality of fins extending radially outward from the plug body between a first end of the plug and a second end of the plug, the plurality of fins being disposed at least partly within the guide sleeve to guide movement of the plug within the guide sleeve, each one of the plurality of fins having a tapered section that tapers radially inward towards the second end of the plug and extends into the closed gap, and a cylindrical section configured to be received in the guide sleeve, the cylindrical section having a circumference that forms a tight clearance fit within the guide sleeve to restrict flow through the guide sleeve.

2. A process control valve comprising:
a valve body having an inlet and an outlet, with a process flow path defined between the inlet and the outlet;
a guide sleeve extending into the process flow path between the inlet and the outlet, the guide sleeve being closed opposite the process flow path to define a gap; and
a plug that is configured to move within the guide sleeve to selectively restrict fluid communication between the inlet and the outlet, the plug comprising a plug body and a plurality of fins extending radially outward from the plug body between a first end of the plug and a second end of the plug, each one of the plurality of fins having a tapered section proximate the second end of the plug, the tapered section tapering radially inward toward the second end of the plug, the plug being disposed at least partly within the guide sleeve with the plurality of fins disposed to guide movement of the plug within the guide sleeve and the tapered section extending into the gap, and a cylindrical section configured to be received in the guide sleeve, the cylindrical section having a circumference that forms a tight clearance fit within the guide sleeve to restrict flow through the guide sleeve.

3. The process control valve of claim 2, wherein each of the plurality of fins comprises a guiding surface spaced apart from and parallel to a longitudinal axis of the plug, the guiding surfaces configured to engage an interior of the guide sleeve to guide the movement of the plug within the guide sleeve.

4. The process control valve of claim 3, wherein the tapered section tapers upwardly and inwardly from the guiding surface to form an angle of between about 95° and about 175° with the longitudinal axis of the plug.

5. The process control valve of claim 4, wherein the tapered section comprises a shearing surface having an edge formed at a conjunction of a first blade surface and a second blade surface, the first blade surface and second blade surface together forming an angle of between about 15° and about 135°.

6. The process control valve of claim 2, wherein the plurality of fins comprises a first fin and a second fin spaced about the plug and extending approximately parallel to a longitudinal axis of the plug, a concave relief surface being formed between the first fin and the second fin.

7. The process control valve of claim 6, wherein the concave relief surface formed between the first fin and the second fin extends radially inward from a guiding surface of the first fin and radially inward from a guiding surface of the second fin to form a substantially parabolic shape.

8. The process control valve of claim 2, wherein each one of the plurality of fins comprises a substantially flat guiding surface and the tapered section of each one of the plurality of fins comprises two surfaces angling toward one another.

9. A plug assembly adapted for use in a push-down-to-close valve that includes an inlet, an outlet, a process flow path that extends between the inlet and the outlet, the plug assembly comprising:
a guide sleeve extending into the process flow path between the inlet and the outlet, the guide sleeve being closed opposite the process flow path to define a gap;
a plug body having a longitudinal axis, the plug body being configured to move within the guide sleeve to selectively block the outlet;
a first end;
a second end spaced apart from the first end along the longitudinal axis; and
a cylindrical section configured to be received in the guide sleeve,
the first end comprising a plugging section tapering outward from the first end toward the second end,
the second end having a plurality of fins extending radially outward from the plug body, each one of the plurality of fins being formed about the longitudinal axis and extending from the second end toward the first end,
each one of the plurality of fins comprising a tapered section and a guiding surface, the tapered section extending radially outward from the second end toward the guiding surface and into the gap, and the guiding surface being configured to move along an interior of the guide sleeve to guide movement of the plug body within the guide sleeve,
the cylindrical section having a circumference that forms a tight clearance fit within the guide sleeve to restrict flow through the guide sleeve.

10. The plug assembly of claim 9, wherein each one of the plurality of fins is formed of a first wall, a second wall, and the guiding surface spanning between the first wall and the second wall, the first wall and second wall each extending outward from the plug body.

11. The plug assembly of claim 10, wherein the first wall and second wall are oriented approximately parallel with one another.

12. The plug assembly of claim 10, wherein the tapered section of each fin is defined by a first blade surface angling inwardly away from the first wall and a second blade surface angling inwardly away from the second wall, ends of the first blade surface and second blade surface joining to form an edge, the edge being configured to cut material within the guide sleeve.

13. The plug assembly of claim 12, wherein the edge extends from the second end of the plug to the guiding surface of each one of the plurality of fins.

14. The plug assembly of claim 10, wherein the plurality of fins includes a first fin and a second fin having a relief formed between the first fin and the second fin and extending from the second end of the plug towards the first end.

15. The plug assembly of claim 14, wherein the relief comprises a parabolic shape extending between a first wall of the first fin and a second wall of the second fin to form a substantially concave surface.

16. The plug assembly of claim 10, wherein the cylindrical section is located between the plugging section and the plurality of fins, and the guiding surface of each one of the plurality of fins is approximately tangent to the outer surface of the cylindrical section.

17. The plug assembly of claim 9, wherein each of the plurality of fins is evenly spaced about the longitudinal axis of the plug.

18. The plug assembly of claim 17, wherein the plurality of fins includes four fins equally spaced apart from one another circumferentially about the plug.

19. The plug assembly of claim 9, wherein at least one of the fins includes a notch formed in the guiding surface, to space the fin apart from the interior of the guide sleeve along the notch.

20. The plug assembly of claim 9, wherein the tapered section angles between the guiding surface and the second end to form an angle of between about 95° and about 175° with the longitudinal axis.

* * * * *